United States Patent
Gurcan et al.

(10) Patent No.: US 7,486,812 B2
(45) Date of Patent: Feb. 3, 2009

(54) SHAPE ESTIMATES AND TEMPORAL REGISTRATION OF LESIONS AND NODULES

(75) Inventors: Metin N. Gurcan, Beavercreek, OH (US); Russell C. Hardie, Centerville, OH (US); Steven K. Rogers, Beavercreek, OH (US)

(73) Assignee: iCAD, Inc., Beavercreek, OH (US)

( * ) Notice: Subject to any disclaimer, the term of this patent is extended or adjusted under 35 U.S.C. 154(b) by 893 days.

(21) Appl. No.: 10/993,176

(22) Filed: Nov. 19, 2004

(65) Prior Publication Data

US 2005/0111720 A1 May 26, 2005

Related U.S. Application Data

(60) Provisional application No. 60/524,837, filed on Nov. 25, 2003.

(51) Int. Cl.
G06K 9/00 (2006.01)
(52) U.S. Cl. ........................... 382/131; 382/128
(58) Field of Classification Search ................. 382/128, 382/130–133; 600/424–427
See application file for complete search history.

(56) References Cited

U.S. PATENT DOCUMENTS 5,531,520 A   7/1996  Grimson et al.
5,636,255 A   6/1997  Ellis
6,466,043 B2  10/2002 Khoury et al.

OTHER PUBLICATIONS

Zhao et al.; Two-Dimensional Multi-Criterion Segmentation of Pulmonary Nodules on Helical CT Images; American Association of Physicists in Medicine; Jun. 1999; 889-895; vol. 26 No. 6.

Fan et al.; Automatic Segmentation of Pulmonary Nodules by Using Dynamic 3D Cross-correlation for interactive CAD Systems; Medical Imaging; 2002; 1362-1369; Proceedings of SPIE vol. 4684; Image Processing.

*Primary Examiner*—Duy M Dang
(74) *Attorney, Agent, or Firm*—Foley Hoag LLP

(57) ABSTRACT

A method for refining shape estimates of detected abnormalities in medical images, particularly for the detection of pulmonary lesions in CT imagery is described. A cue point is refined prior to an initially segmentation of the lesion. A radial gradient is computed for points on an initial segmented lesion. Portions of the lesion with radial gradients deviating beyond a threshold angle are removed from the lesion. Registering imagery from more than one CT exam uses a high intensity structure, essentially bone, to provide coarse and fine alignment of a set of two-dimensional images is also described. A MIP image is formed from the three-dimensional images. A second MIP image is then formed from imagery. The second MIP image is correlated with the first MIP image to determine a preferred registration location.

47 Claims, 15 Drawing Sheets

MIP, First Series

MIP, Second Series

Registration of MIP Projections

SHAPE ESTIMATES AND TEMPORAL REGISTRATION OF LESIONS AND NODULES

CROSS-REFERENCE TO RELATED APPLICATIONS

This application claims the benefit of U.S. Provisional Application No. 60/524,837, filed Nov. 25, 2003, incorporated herein by reference.

BACKGROUND OF THE INVENTION

1. Field of the Invention

The present invention generally relates to computer-aided detection (CAD) of suspicious regions in three-dimensional medical imagery and, in particular, relates to improving shape estimates of nodules detected in three-dimensional imagery of lungs as well as registering three-dimensional imagery from multiple computed tomography (CT) exams.

2. Discussion of Background

Lung cancer is now the most common form of cancer diagnosed in the United States and remains a leading cause of cancer death in the United States in both males and females. Lung cancer accounts for 14% of all cancer diagnoses and over 30% of all cancer deaths. The American Cancer Society estimates approximately 173,000 new lung cancer cases will be detected and some 160,000 lives will be lost in 2004. The death rate from lung cancer rose 600 percent between 1930 and 1997, according to a report from the Journal of the American Medical Association.

Lung cancer is caused by abnormal cells growing within the lung tissue and has a risk of spreading to lymph nodes in the lungs and mediastinum. The earlier lung cancer is detected, the better the chance the patient's survival rate will increase. According to the American Cancer Society, the overall five-year survival rate for lung cancer is less than 15 percent. However, when lung cancer is found in the early stages (Stage 1), the five-year survival rate increases to more than 50 percent. Unfortunately, lung cancer is difficult to detect in its early stages. Today, only 15 percent of lung cancer is detected in the early, most treatable stages.

The chest radiograph, long the mainstay of radiology, often provides the first opportunity for a radiologist to diagnose a patient with lung cancer. Conventional chest x-rays typically provide two images for a radiologist to review. The images show front and side views of a patient's chest. A complicated anatomy combined with perceptual problems that accompany the projection of a three-dimensional object (the patient) into two dimensions (the image plane), however, makes identification of lung nodules a burdensome task for radiologists, resulting in a detection rate has been estimated to be between 20% and 50%, see Lorentz, et al., "Miss rate of lung cancer on the chest radiograph in clinical practice," Chest, 115:720-724, 1999. Detected nodules are usually large and at a later stage. Computer vision methods for assisting interpretation of chest x-rays have been researched and developed over at least the past 16 years. See, for example, U.S. Pat. Nos. 4,851,984 and No. 4,839,807.

CT systems produce volumetric images, providing three-dimensional information of structures internal to the body. The detection of lung nodules in CT systems is still confounded by the presence of blood vessels in the lungs. In addition, this imagery is commonly viewed on film as a collection of many tens of two-dimensional images, also referred to as slices. Each slice is reviewed by the radiologist in the search for abnormalities. Although multiple slices provide more opportunities for a lesion to be detected, the possibility of missing a lesion is also increased due to the increased workload by generating a greater number of individual images per scan. A thoracic CT scan formerly produced approximately 30 sections with the 10-mm collimation that was standard for many years. The same type of scan, with the 1.25-mm collimation available on state-of-the-art multidetector scanners, now generates about 240 section images for radiologists to interpret. With an increase in the number of CT scans being performed for a wide variety of diagnostic and screening purposes compounded by an increasing number of images acquired during each scan, computerized techniques for the automated analysis of CT scans for disease (and especially for lung nodules that may represent lung cancer) are quickly becoming a necessity. CAD systems are now commercially available and are being developed to assist in challenges of detecting lung cancer in chest imagery.

In initial processing steps, CAD systems typically detect many candidate suspicious areas. In subsequent processing, the initial detections are analyzed to determine whether or not to display a detected region to a user in the final stage. Accurate shape estimates of the initial detections are essential to make good decisions regarding whether or not detections are ultimately displayed.

CAD systems are used to assist radiologists in the detection of suspicious lesions. It is essential for CAD systems to have a reliable estimation of the shape of a lesion in order to make accurate decisions regarding whether or not an initial CAD system detection is ultimately displayed to a user. Therefore, there is a need for a method and system for accurate shape estimation of nodules.

Additionally, if a user or CAD system provides a specific cue point about which to estimate a lesion's shape, current methods can be sensitive to the properties of the image at that location. That is, the estimated shape of a lesion can vary significantly as a function of the voxel indicated as a cue point. Voxels are the smallest distinguishable box-shaped parts of three-dimensional images. Because a lesion's shape is a key property used in determining a diagnostic measure of the lesion, a cue-point independent method for estimating the lesion's shape is needed.

Furthermore, in many case, it is of interest to compare two different series of three-dimensional imagery obtained from examinations conducted at different times. In this case, there is a need for imagery from two or more sets to be registered before manual or automated methods may be used to assess temporal changes in a lesion found in both series.

SUMMARY OF THE INVENTION

The present invention provides for a method for refining shape estimates of detected abnormalities in medical images, particularly for the detection of pulmonary lesions in computer tomography imagery. A cue point is refined prior to an initially segmentation of the lesion. The cue point is provided by the radiologist or by a CAD system. A radial gradient is computed for points on an initially segmented lesion. Portions of the lesion with radial gradients deviating beyond a threshold angle are removed from the lesion.

A method for registering imagery from more than one computer tomography exam uses high intensity structure (e.g., bones) to provide coarse and fine alignment of a set of two-dimensional images. In a first step, a maximum intensity projection image is formed from the three-dimensional images. In a second step, a second maximum intensity projection image is formed from the imagery. The second maximum intensity projection image is correlated with the first maximum intensity projection image to determine registration parameters.

Accordingly, it is an object of the present invention to provide for a method for accurate shape estimation of nodules.

It is another object of the present invention to provide for a cue-point independent method for estimating the lesion's shape.

It is yet another object of the present invention to provide for the registration of three-dimensional imagery from multiple computer tomography examinations.

Other objects and advantages of the present invention will be apparent in light of the following description of the invention embodied herein.

BRIEF DESCRIPTION OF THE DRAWINGS

The following detailed description of specific embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings that form a part hereof, and in which are shown by way of illustration, and not by way of limitation, specific preferred embodiments in which the invention may be practiced. It is to be understood that other embodiments may be utilized and that logical, mechanical and electrical changes may be made without departing from the spirit and scope of the present invention.

Figure 1:
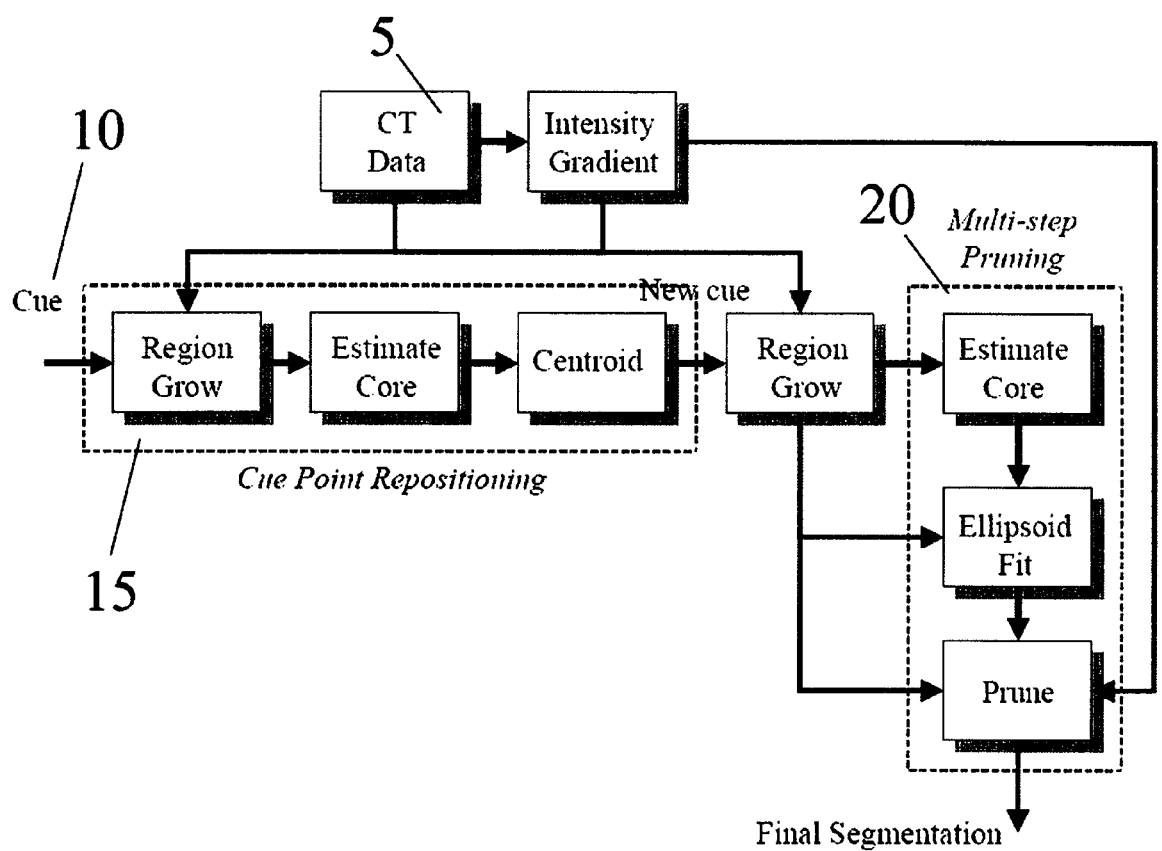
FIG. 1 is an exemplary embodiment of the cue point repositioning and final segmentation methods according to the present invention.

A CAD and analysis system can help physicians quickly and accurately identify and analyze problematic regions of the body. For example, CAD systems are used to detect pulmonary nodules and colonic polyps using CT imagery. This invention addresses one part of such as system, a tool designed to segment regions with minimal cueing from radiologists. In a CAD driven embodiment, cueing is provided by detection algorithms. In an interactive embodiment, cues are provided by a user who indicates a cue point of a lesion. A block diagram showing the main operations in the nodule segmentation algorithm is shown in FIG. 1. Each of the main functional blocks in FIG. 1 is described below. A set of CT data, 5, is viewed by a user who identifies a suspicious region by providing a cue, 10. The cue is input to a cue point repositioning method, 15, for refinement.

Cue Point Repositioning

To begin, a cue point is provided by the user, or a CAD system, and a preliminary segmentation is performed. This preliminary segmentation involves floodfill region-growing with a cue point connectivity constraint. This means that voxels that are above a given threshold, and that are connected in three-dimensions to the cue point, are segmented. A core estimation procedure is then executed as known in the art, see, for example, "Automatic segmentation of pulmonary nodules by using dynamic 3D cross-correlation for interactive CAD systems," by Fan et al. in Medical Imaging 2002: Image Processing, Milan Sonka, J. Michael Fitzpatrick, Editors, Proceedings of SPIE Vol. 4684 (2002), pp 1362-1369. The core estimation procedure is designed to eliminate vessels and other external anatomical structures that may be inadvertently captured in the region grow output. Core estimation is designed to provide a rough estimate, intended to establish the main volume of the nodule. The centroid of the core is used as the effective cue point for the final segmentation. If, however, the centroid is not a voxel contained within the core itself—which is possible for a donut-shaped core—the original cue point is used.

The cue point repositioning operations are shown in the dashed box, 15, in FIG. 1. The purpose of the cue point repositioning is to lessen the sensitivity of the algorithm to the specific location of the user cue. With this approach, the same central voxel or a nearby voxel will be used regardless of the location of the actual user cue point within the nodule.

Region Growing

After repositioning the cue point, the same floodfill region grow and core estimation procedure are repeated (using the new cue point). As mentioned before, the region growing involves threshold segmentation with a three-dimensional connectivity constraint to the cue point to form the initial segmentation. In one embodiment of the present invention, only voxels within the lung mask are candidates for the region growing. Methods for obtaining lung masks are well known in the art, see, for example, U.S. Pat. No. 6,335,980. Methods for obtaining and using other organ masks are also possible, such as, for example, colon masks. With a properly selected threshold, this procedure yields the nodule and possibly attached vessels or other anatomical structures.

Figure 2:
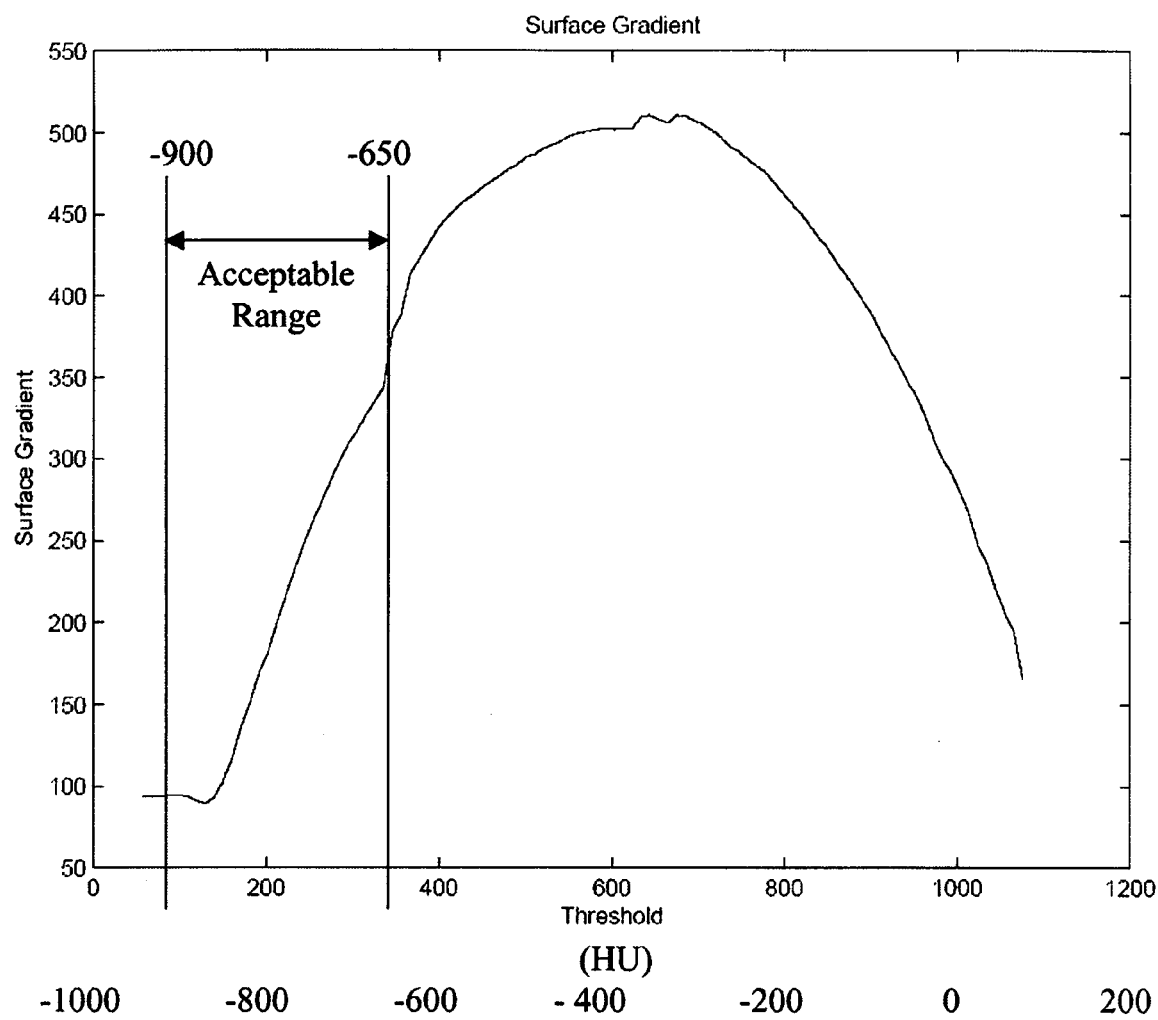
FIG. 2 is a plot of the average surface gradient for an exemplary lesion as a function of segmentation threshold according to an embodiment of the present invention.

An adaptive threshold designed to maximize the average magnitude surface gradient is used. Methods for adaptive thresholding are also well known in the art, see, for example, "Two-dimensional multi-criterion segmentation of pulmonary nodules on helical CT images," Med. Phys. 26(6), June 1999, pp. 889-895, by Zhao and Yankelevitz. The magnitude of the gradient is computed at every point on the surface of a flood filled region. The average of the gradient magnitude is computed along contours specified by a range of threshold values for the CT images. A plot of typical surface gradients versus the corresponding thresholds is shown in FIG. 2. The threshold values shown in this figure can be converted into Hounsfield units (HUs) by subtracting 1000. Note that a clear peak can be identified making this a convenient threshold merit function. If the maximum surface gradient occurs at a value within a predetermined acceptable range of Hounsfield units, the value is used as a threshold, otherwise the upper limit on the acceptable range is used as the threshold. In the example of FIG. 2, the value is not used because it occurs outside the acceptable range.

Figure 3:
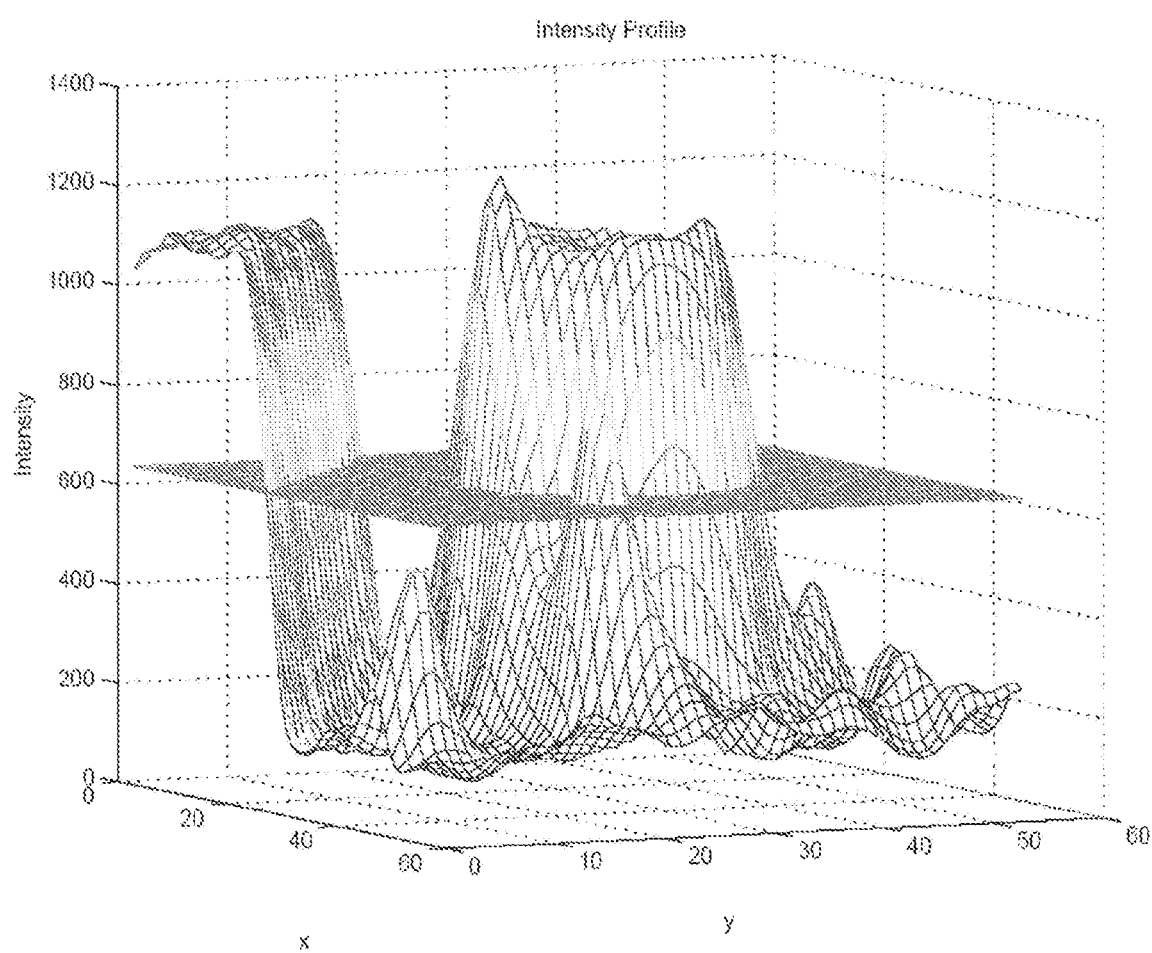
FIG. 3 illustrates an exemplary intensity profile of a lesion and the plane corresponding to the threshold level providing the maximum average surface gradient according to an embodiment of the present invention.

This method of threshold selection tends to yield good performance in most cases, but sometimes produces a segmentation that is too small. This is particularly true with high intensity nodules. FIG. 3 shows the intensity profile for a relatively bright nodule in one slice along with a plane at the height of the threshold yielding maximum surface gradient. In this case, it appears that a lower threshold would yield a larger nodule and that the threshold selected is far above the noise floor. To address this, the threshold is restricted to a specific range in HUs. Within this range, the threshold yielding a segment with the maximum average magnitude surface gradient is selected. The upper and lower threshold limits are empirically-based tuning-parameters that control how bright and dim nodules are segmented. It has been observed that a lower limit of −900 HUs and an upper limit of −650 HUs appears to work well in most cases.

Multi-Step Pruning

Figure 4:
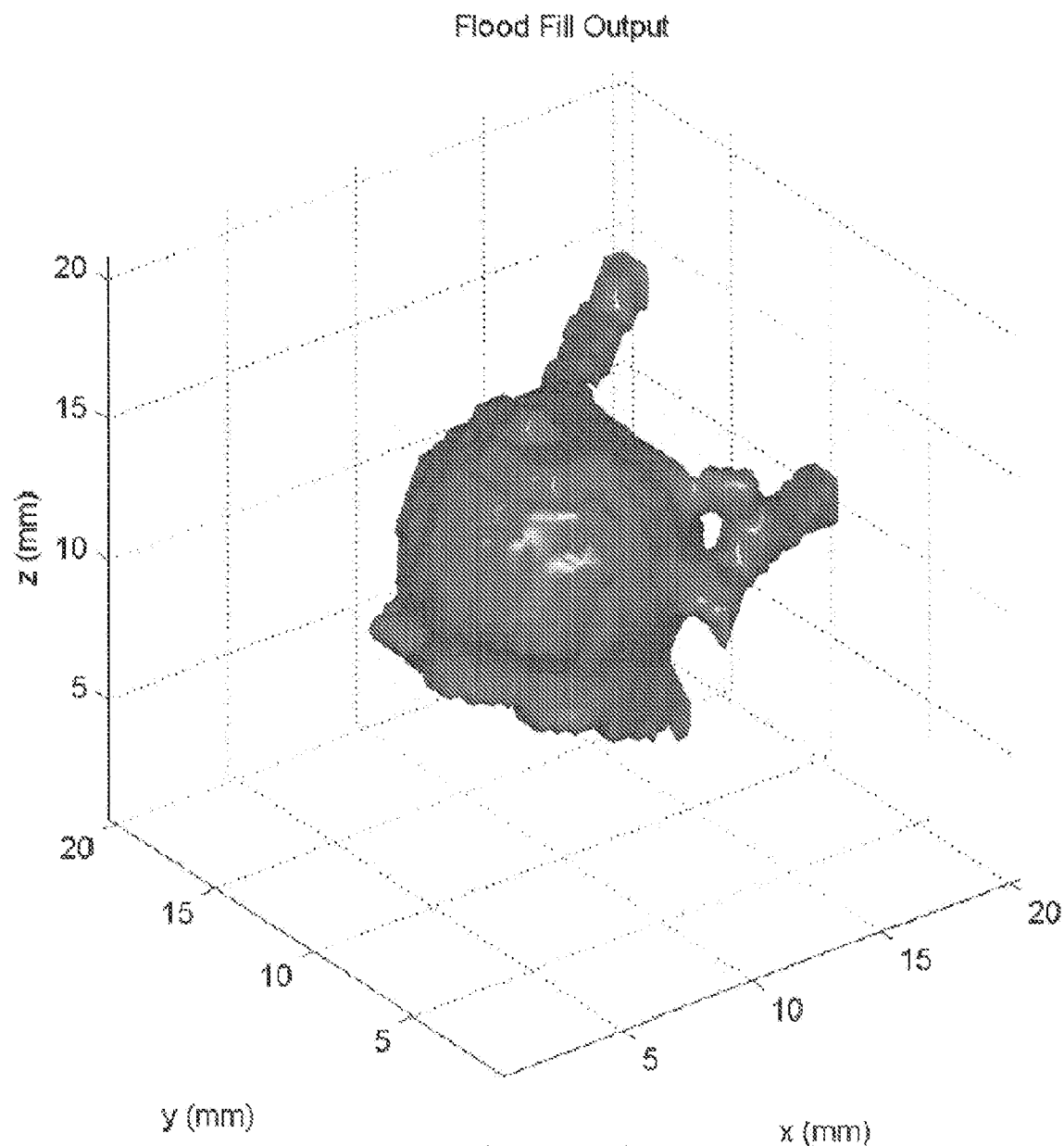
FIG. 4 is a flood-filled initial segmentation of an exemplary lesion according to an embodiment of the present invention.

The result of a floodfill region-grow segmentation is shown in FIG. 4. Note that the nodule and some connected vessels are segmented. A multi-step pruning procedure, designed to remove external anatomical structures such as attached vessels, is subsequently applied. Thus, the final segmentation will never include more than the floodfill region-grow segmentation, but may include less due to pruning. The multi-step pruning procedure, is identified by the dashed box, 70, in FIG. 1.

Core Estimation for Multi-step Pruning

The purpose of core estimation is to obtain the location of the center of the nodule as well as its basic shape without being significantly biased by the anatomical structures external to the lesion. The location and shape information can be used to fit an ellipsoid to the nodule in the floodfill output. The best-fit ellipsoid is used to define the pruning boundary. Only objects outside the ellipsoid are candidates for pruning. The ellipsoid fitting process is addressed in a following subsection.

The multi-step pruning procedure begins with a morphological opening operation, erosion followed by dilation. The result of the opening will be referred to as the object core. The challenge in the core estimation is to select the appropriate size and shape of structuring element for the opening operation. In a preferred embodiment, a two-dimensional circular structuring element is used. The radius of the structuring element is increased until the resulting opened object meets a specific three-dimensional sphericity requirement, or becomes too small.

Figure 5:
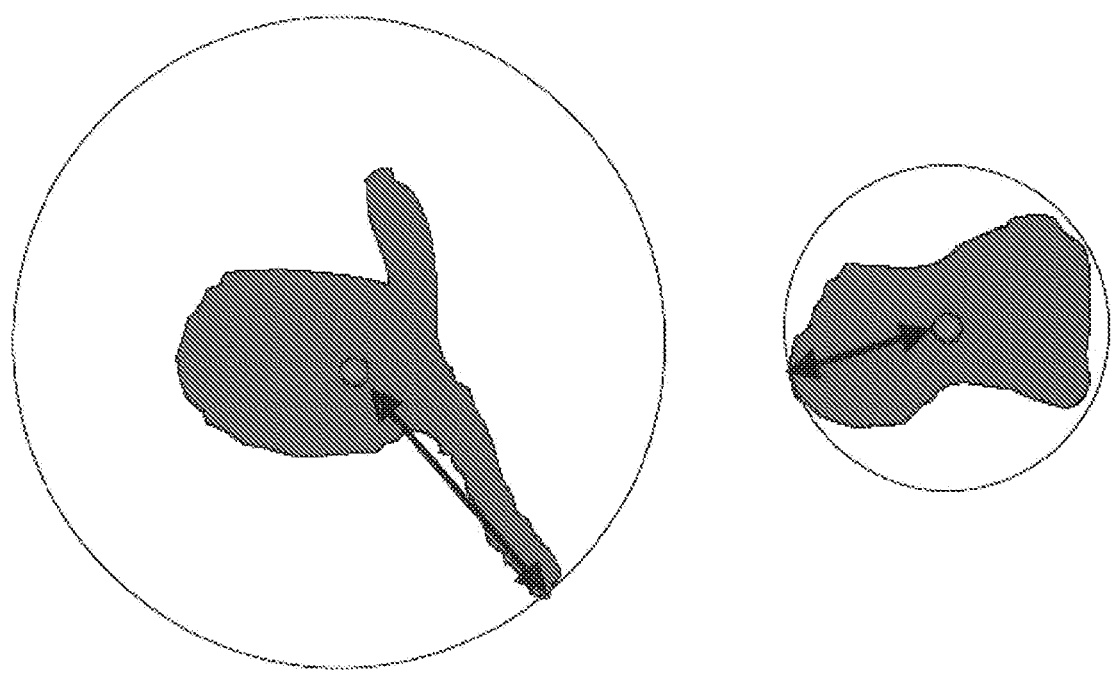
FIG. 5 illustrates two-dimensional examples of objects with low and moderate sphericity according to an embodiment of the present invention.

A sphericity metric is computed to provide a maximum penalty for vessel-like structures. For this metric, the centroid of the candidate object is computed. Next, the distance between the centroid and the point farthest from the centroid that is contained within the object is found. The volume of a sphere of this radius is now computed. The ratio of the object volume to the sphere volume defines sphericity. FIG. 5 shows examples in two-dimensional of objects with low and moderate sphericity.

Figure 6:
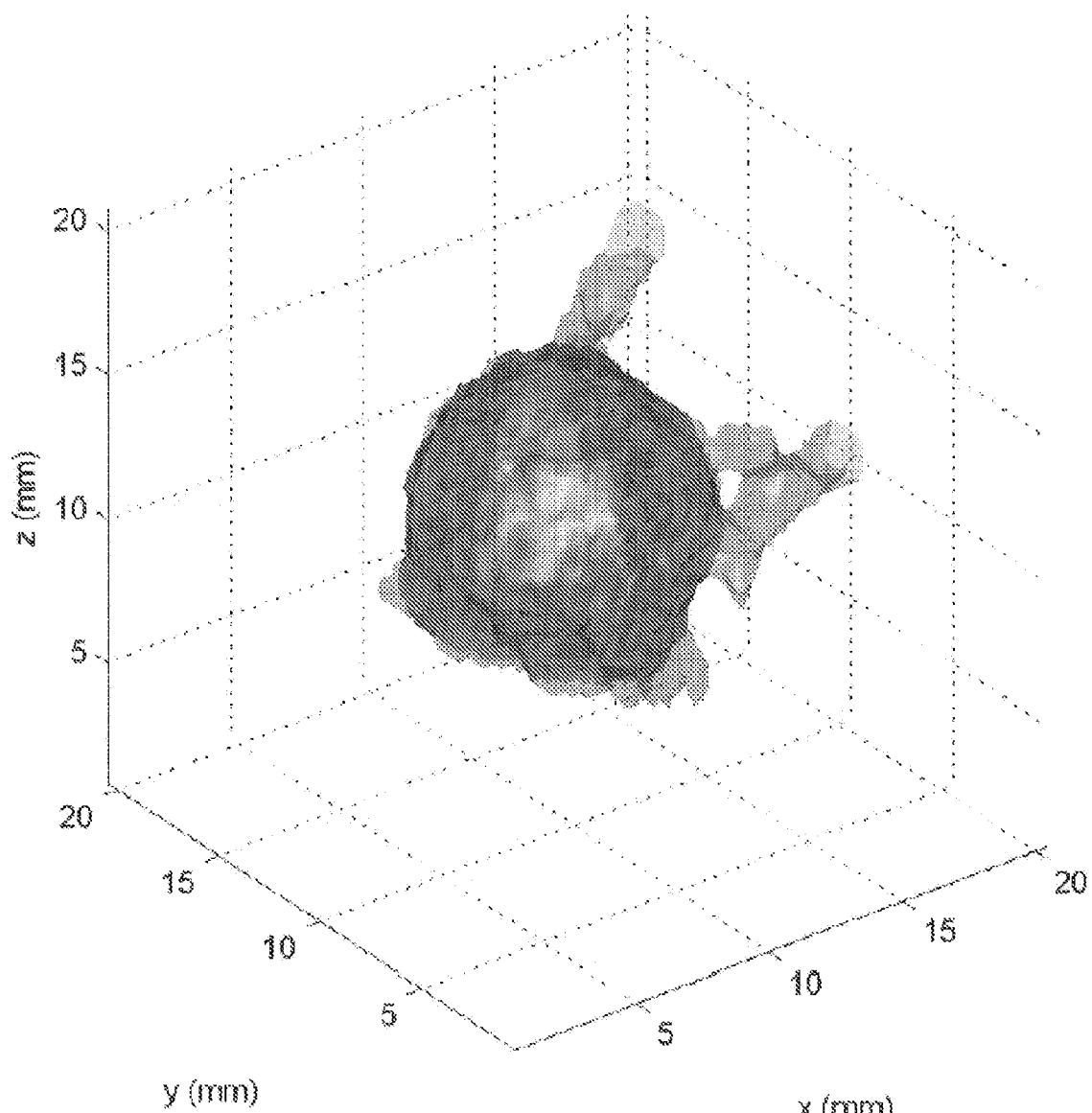
FIG. 6 illustrates an example of a flood-fill region grow and corresponding core estimate obtained using morphological opening according to an embodiment of the present invention.

The result of the opening operation, applied to the floodfill region-grow output in FIG. 4, is shown in FIG. 6. The smallest structuring element to yield an opened object with sphericity greater than or equal to a predetermined threshold is used. In one embodiment of the present invention, the sphericity threshold is about 0.15. Note that the opened core may still include some portions of external anatomical structures and may not contain subtle surface features of the nodule that are diagnostically important. It does, however, provide us with the basic nodule location and shape.

In some cases the opening operation may indicate removal of the portion of the segmentation containing the cue point, but indicate acceptance for some other portion of the segment. If this event occurs, it is an indication that a small nodule is directly connected to a larger structure. In this case, the portion indicated for removal with the cue point is retained and the portion indicated for acceptance is removed. The core estimation process then begins anew using the current retained segment as the starting point.

Ellipsoid Fitting for Multi-Step Pruning

To form a pruning boundary, an ellipsoidal model for the nodule shape is used. Such a model helps to distinguish the nodule from external anatomical structures. In particular, an ellipsoid is fit to the floodfill output. While this could be done without the core information, such a fitting procedure would be cumbersome and computationally expensive. This is because the fitting involves minimizing the fit error as a function of eight ellipsoidal parameters: three center coordinates, three axis lengths, and two angles. To avoid fitting issues, the centroid of the core is used as the ellipsoid center and the covariance of the core voxel positions defines the shape of the ellipsoid. Such a procedure is known in the art. For example, see "Automatic segmentation of pulmonary nodules by using dynamic 3D cross-correlation for interactive CAD systems," by Fan et al., in Medical Imaging 2002: Image Processing, Milan Sonka, J. Michael Fitzpatrick, Editors, Proceedings of SPIE Vol. 4684 (2002), pp 1362-1369.

Figure 7:
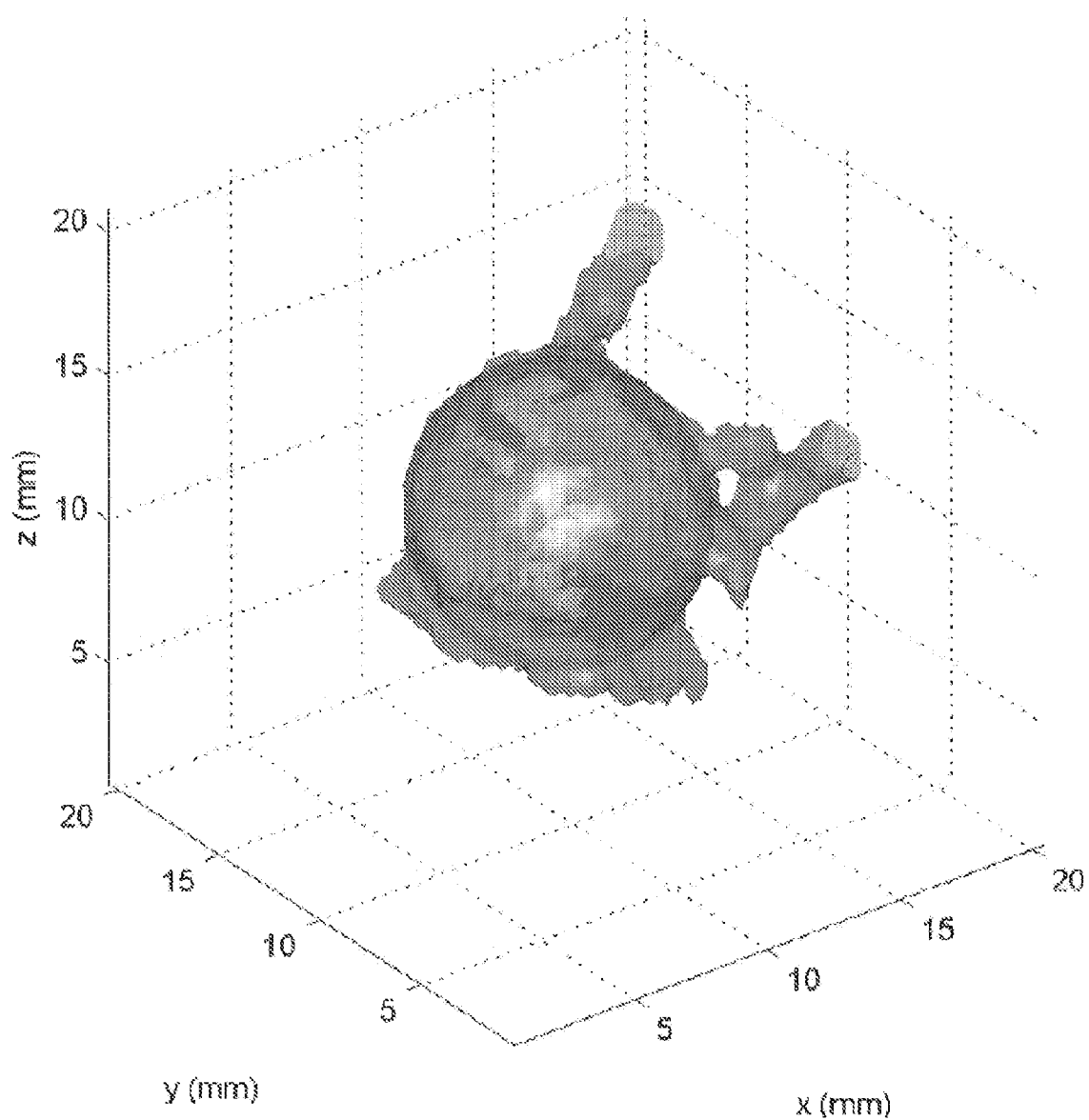
FIG. 7 illustrates the ellipsoid fit to the flood-fill region grow segmentation according to an embodiment of the present invention.

The only remaining parameter to search is the overall size, for which the core covariance provides an initial estimate. Ellipsoids of different sizes are formed and compared with the floodfill output. In one embodiment of the present invention, the ellipsoid with the minimum Hamming distance to the floodfill output, is used as the best-fit ellipsoid. Hamming distance is the simply the sum of differing voxels for two binary masks. An example of an ellipsoidal fit is shown in FIG. 7.

Figure 8:
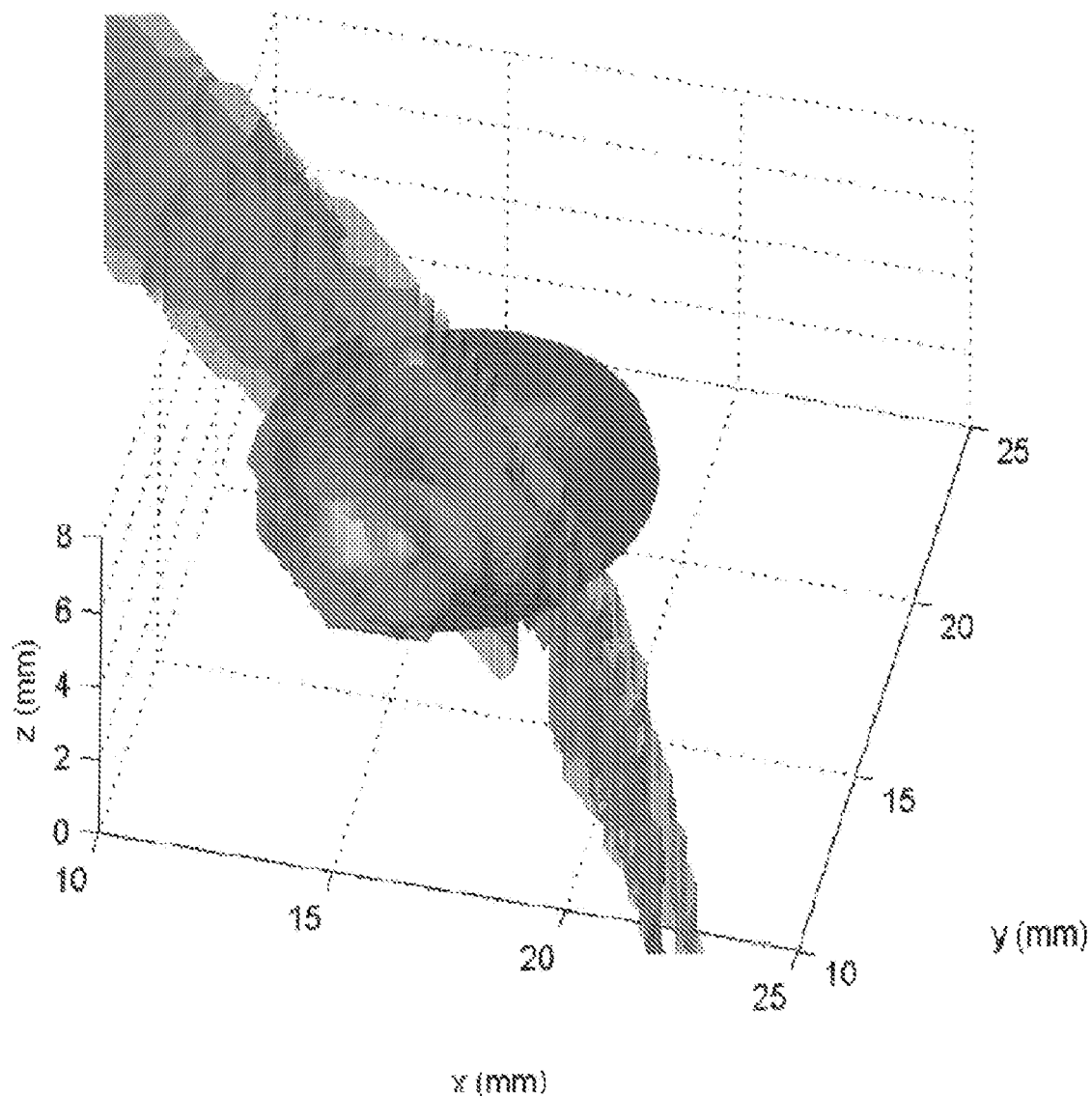
FIG. 8 illustrates an exemplary ellipsoid fit to a flood-fill region grow output for a juxtapleural nodule according to an embodiment of the present invention.

In the case of juxtapleural nodules, it has been found that a semi-ellipsoidal model appears to provide a more appropriate match to the underlying nodule shape. Thus, if sufficient contact between the nodule core and the lung wall is observed, a modified ellipsoid fitting procedure is used. In particular, the centroid of the contact surface between the nodule and lung wall is used as the ellipsoid center. The core voxel positions are mirrored about this center to artificially create a symmetric core. The covariance of the modified core voxel positions is estimated and used for the ellipsoid fit. The Hamming distance between the template ellipsoid and the floodfill output is only computed inside the lung area. An example of a juxtapleural ellipsoidal fit is shown in FIG. 8. Note, the geometry of a juxtapleural nodule is similar to that of a polyp in the colon.

Final Pruning for Multi-step Pruning

Figure 9:
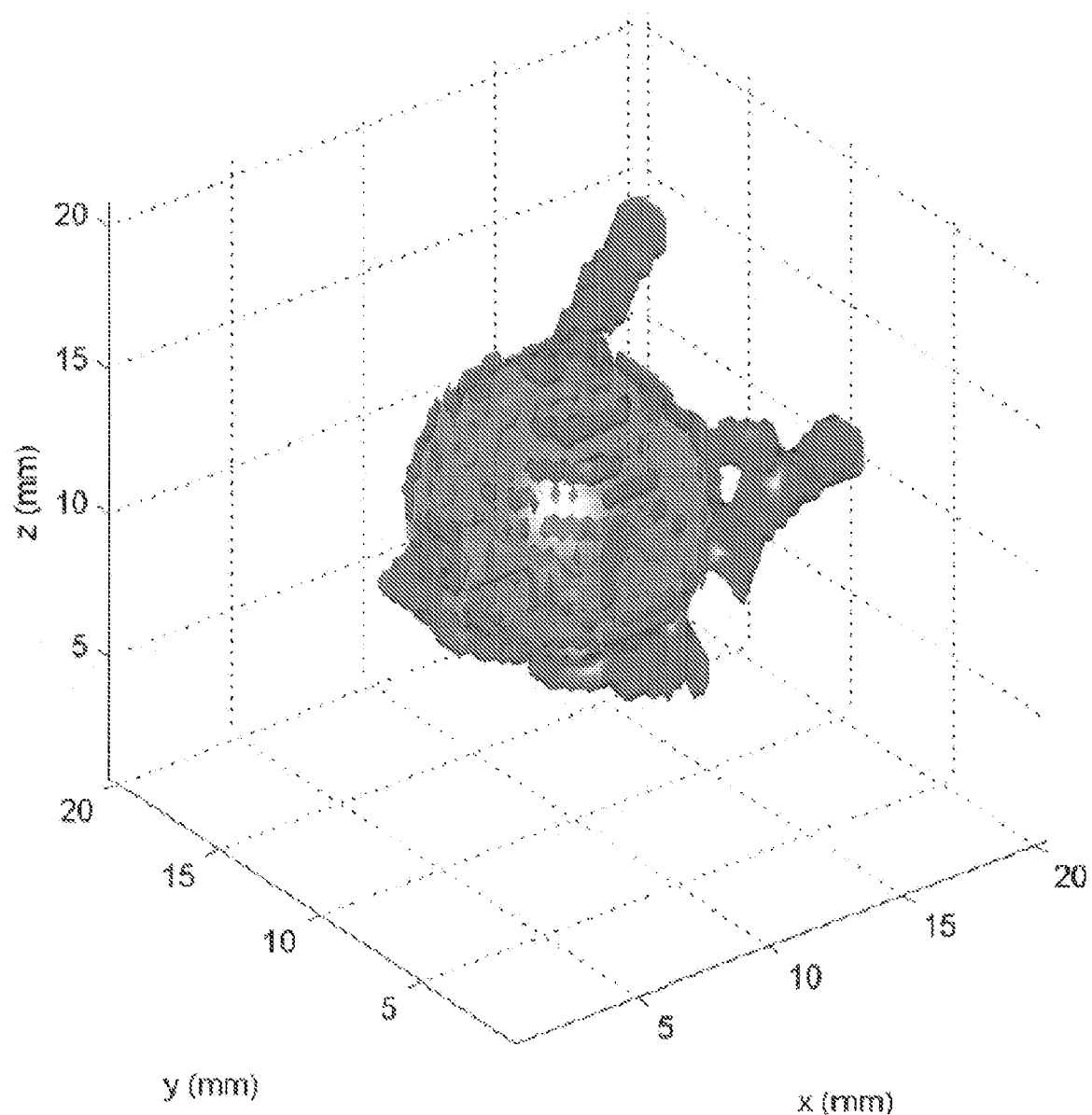
FIG. 9 illustrates voxels outside the best-fit ellipsoidal core which are candidates for removal by a pruning procedure according to an embodiment of the present invention.

Final pruning begins with a logical AND operation performed between a scaled version of the best-fit ellipsoid and the floodfill output. Any structure outside of this result is a candidate for pruning. Outside structures are removed if they have characteristics that are not typical of nodule surfaces. FIG. 9 shows the best-fit ellipsoid and all of the structures outside, which are considered for pruning. Enlarging the best fit ellipsoid has the effect of reducing the size of the outside structures which may get pruned. This can be helpful in cases where the nodule is not accurately modeled by an ellipsoid. The scaling amount is an algorithm tuning parameter.

Figure 10:
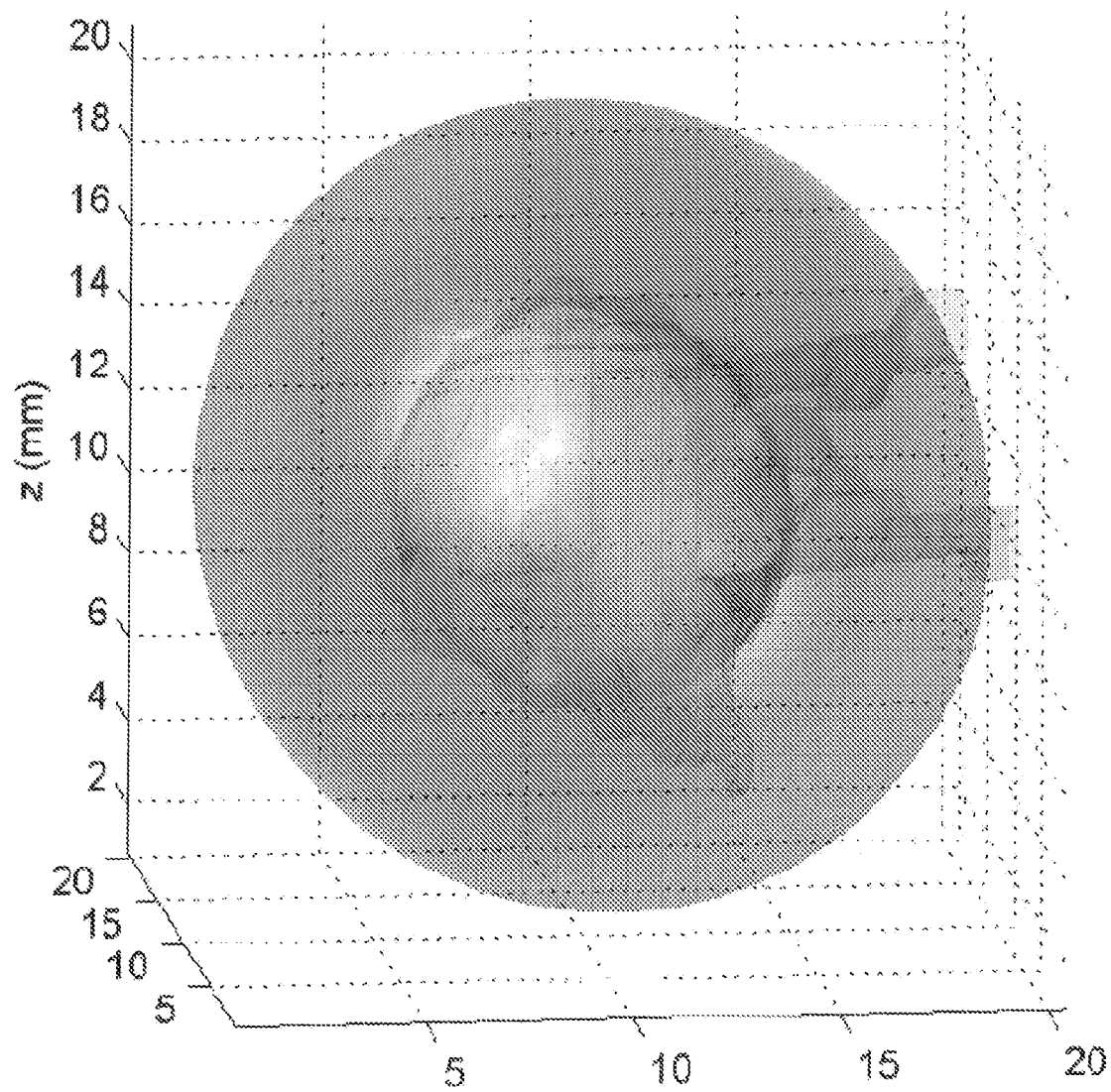
FIG. 10 is an example of an outer ellipsoid used as a boundary for pruning according to an embodiment of the present invention.

Two tests are used to determine if an outside structure should be removed. First, if the object penetrates an outer ellipsoid, of the same shape as the best-fit ellipsoid but larger, it is removed. This is appropriate because typical nodules are compact and extended structures are generally blood vessels or lung wall remnants. Such an outer ellipsoid is illustrated in FIG. 10. Any voxel beyond the ellipsoid is removed from the lesion. The size of the outer ellipsoid is a tuning parameter that controls the acceptable level of departure from the ellipsoidal model. Also, if the angle of the surface gradient anywhere on an outside object deviates from a radial vector by more than a predetermined amount it is removed. In one embodiment the predetermined amount is 80 degrees. The radial vector runs from the centroid of the core to the surface voxel in question. The angle threshold is a tuning parameter that allows one to control the allowable surface roughness of the segmented nodule.

Figure 11:
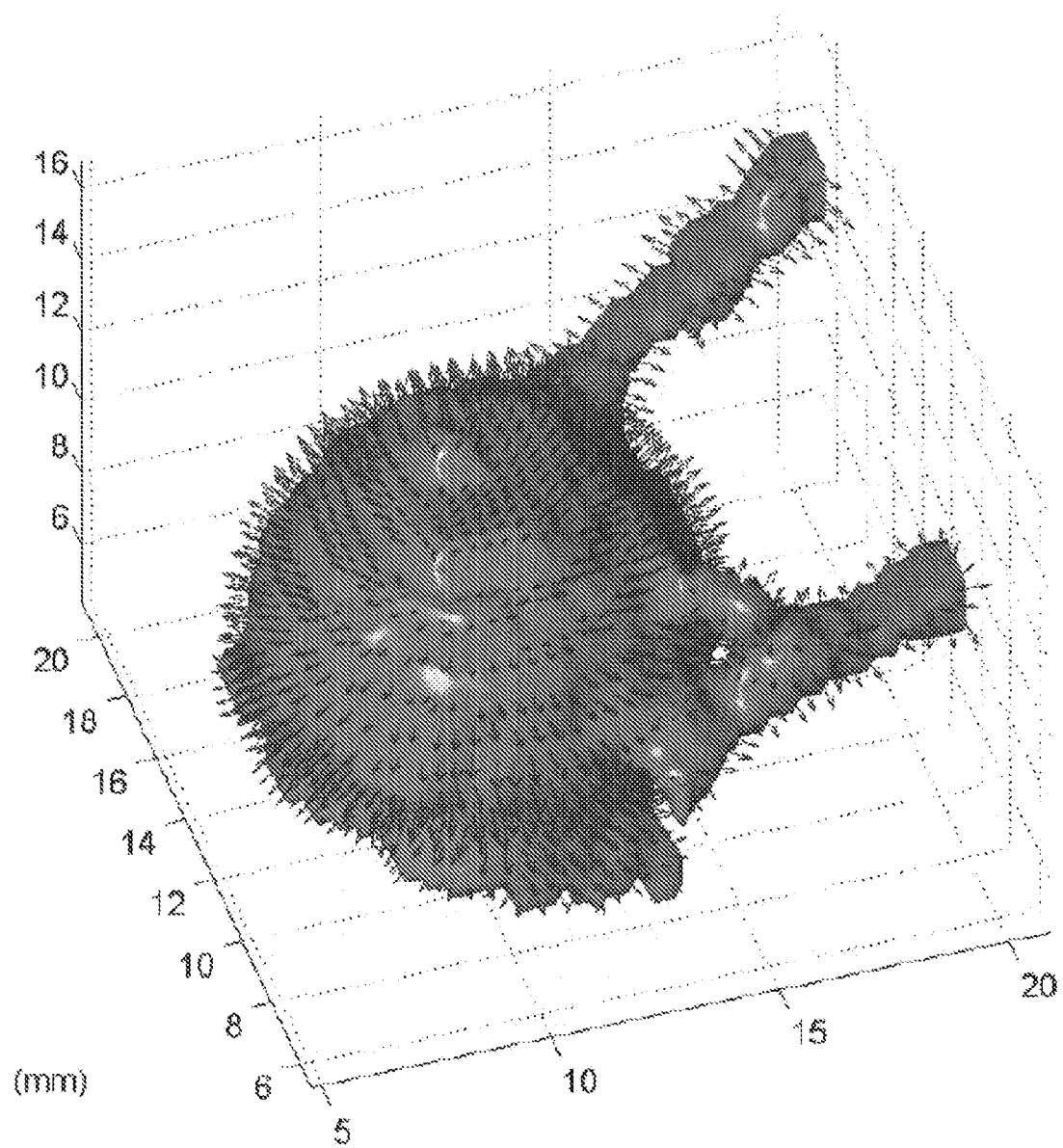
FIG. 11 illustrates the surface gradient vectors on an exemplary nodule according to an embodiment of the present invention.
Figure 12:
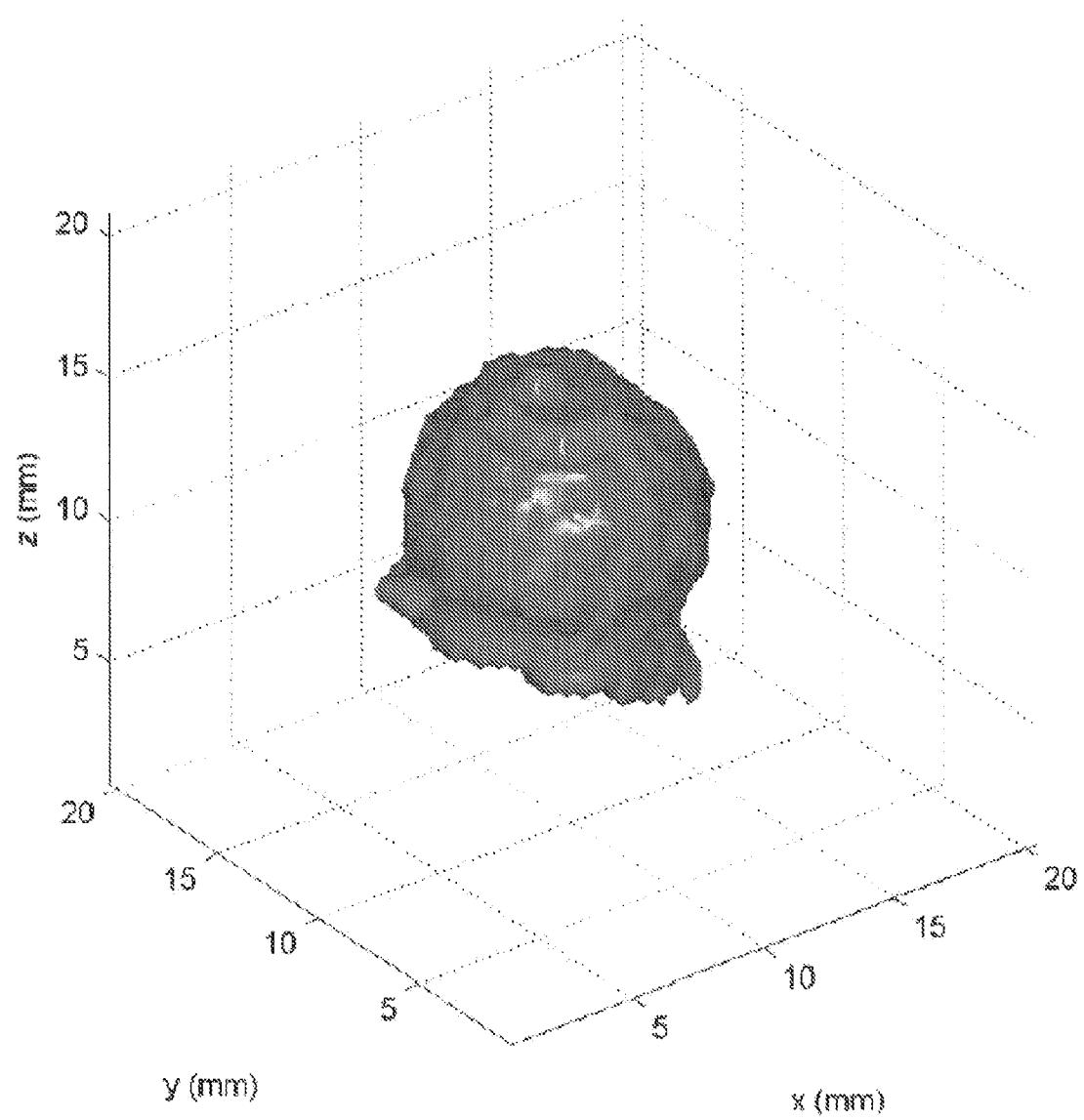
FIG. 12 illustrates the result of the pruning step according to an embodiment of the present invention.
Figure 13:
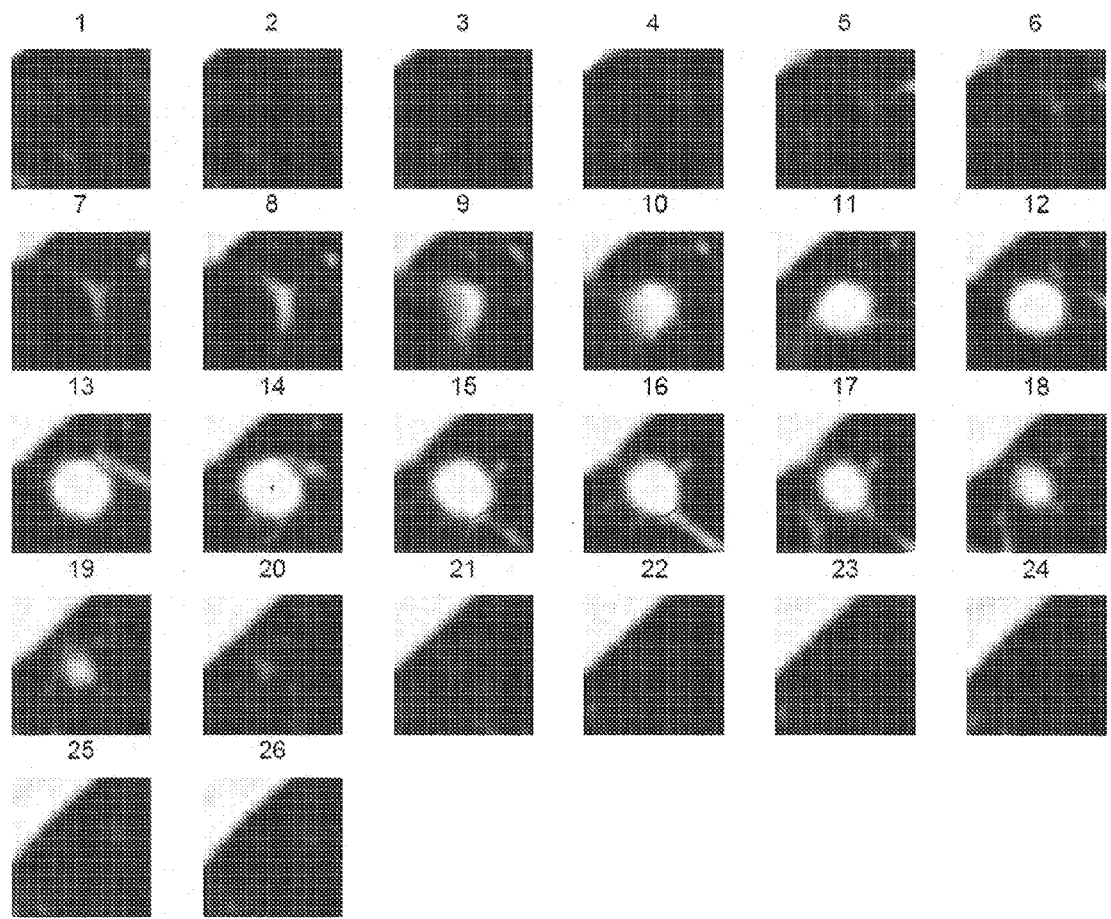
FIG. 13 illustrates contours of the final segmentations for a set of images from a CT exam according to an embodiment of the present invention.

The surface gradient vectors are shown in FIG. 11 for the same nodule as shown in previous figures. It is clear that significant angular deviation from radial is provided by the vessels emanating from the nodule. Thus, such structures are easily identified and removed. The final pruned object is shown in FIG. 12. The segmentation delineated on each slice from part of a set of CT data is shown in FIG. 13.

Automated Registration

Automated registration is required for analysis and comparison of data obtained from the same patient but from different CT studies. Registration provides a common spatial reference point to assist in a comparison of a lesion's characteristics across a time interval.

Figure 14:
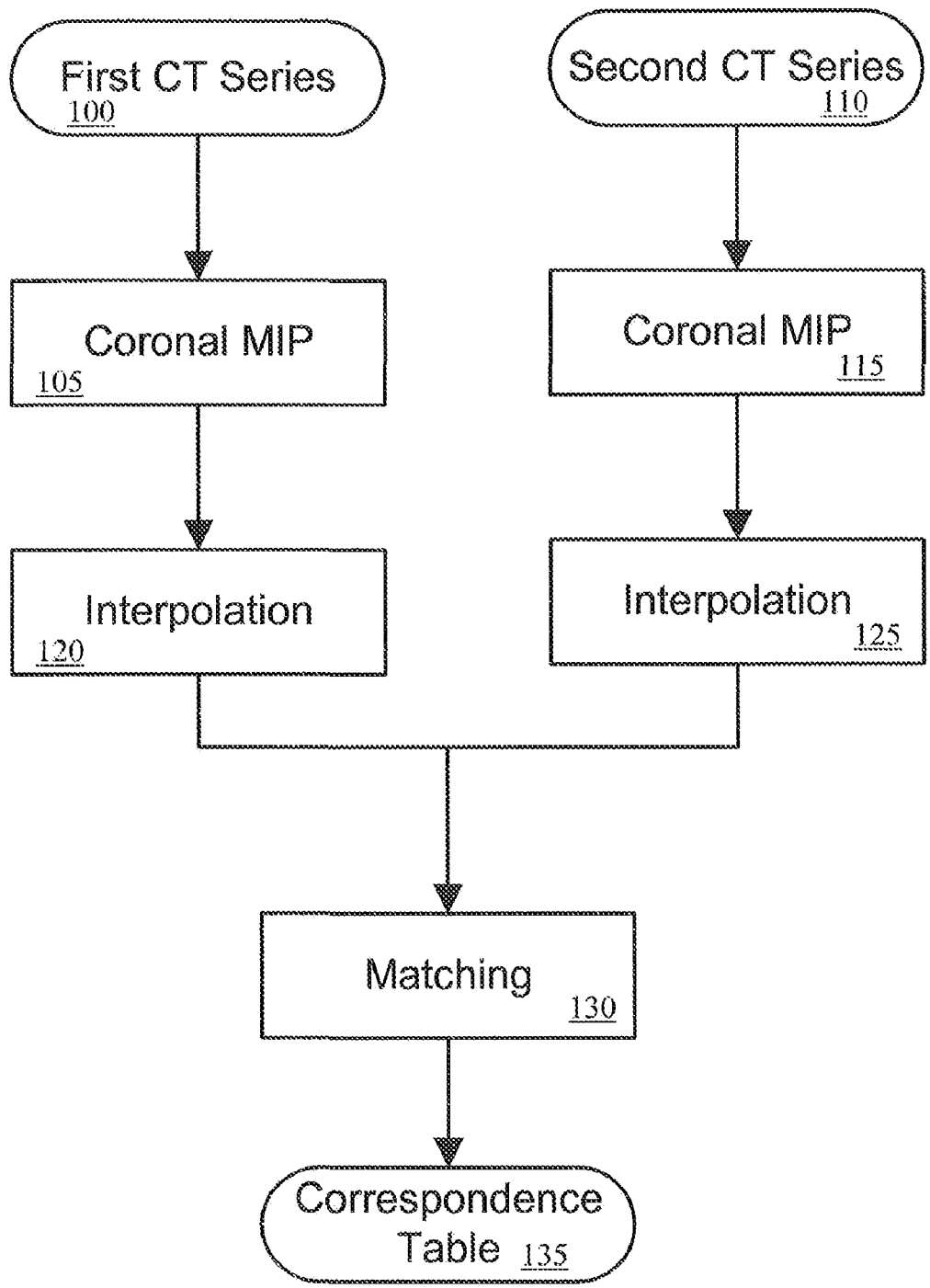
FIG. 14 is an overview of the automated method for registering imagery from two CT exams according to an embodiment of the present invention.

One of the major landmarks in volumetric body imaging is high intensity structures, such as bone. By examining the bone structure in different series, global registration can be accomplished. FIG. 14 shows an overview of the registration procedure. First and second CT series are obtained from a patient, 100, 110. In each series, the coronal maximum intensity projection image is computed to emphasize essentially the bone structure in each series, 105, 115. In one embodiment of the present invention, a preprocessing step identifies body regions and the maximum intensity projection (MIP) images are computed using voxels from only within the body.

Figure 15:
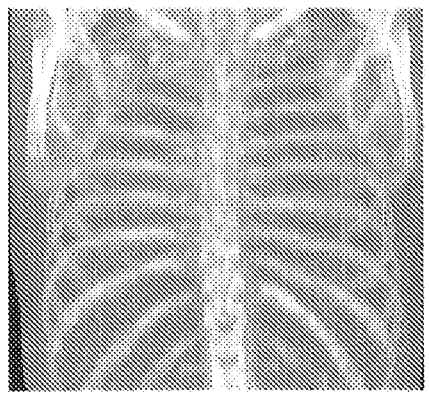
FIG. 15 shows maximum intensity projection images from two CT exams, the corresponding correlation surface, and the result of the registration process according to an embodiment of the present invention.
Figure 15:
Figure 15:
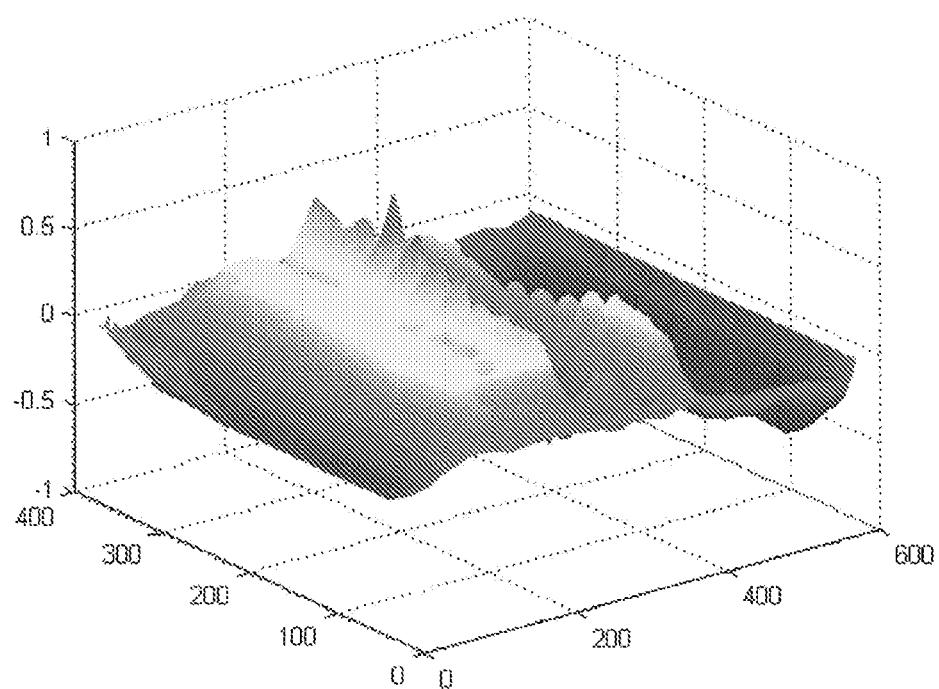
Figure 15:
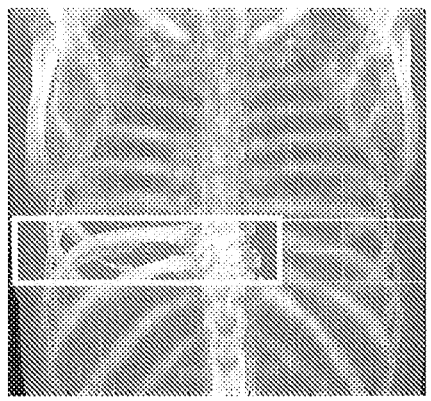

One of the MIP images, or part of it, is searched for within the other MIP image. In one embodiment, the search is accomplished using a two-dimensional correlation score. Horizontal and vertical offsets for registration are determined by locating the (x,y) coordinates of the maximum value of the two-dimensional correlation of the MIP images. Since the MIP images are formed in the coronal direction, the horizontal and vertical offsets correspond to axial and coronal displacements in the volumetric images. FIG. 15 is an overview the registration technique. The MIP images of the first and second series are cross-correlated, to produce the correlation surface. The peak in the correlation surface provides the horizontal and vertical offsets corresponding to the registration, 135. The MIP of the Second Series is shown overlaid on the MIP of the First Series after registration, 130. The interpolation steps, 120, 125 shown in each branch of FIG. 15 are needed only when the interpixel spacings of the MIP images are unequal.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A method of providing a refined cue point for a lesion segmentation, the method comprising:
   providing an initial cue point for said lesion;
   growing a region about said initial cue point;
   computing a new cue point using said grown region by using core estimation; and
   using said new cue point as said refined cue point.

2. The method of claim 1, wherein growing involves using only voxels within an organ mask.

3. The method of claim 1, wherein growing further comprises segmenting voxels that are above a given threshold and are connected in three dimensions to said initial cue point.

4. The method of claim 3, wherein said threshold is designed to maximize an average magnitude surface gradient.

5. The method of claim 4, wherein said average magnitude surface gradient is computed at every surface of said grown region.

6. The method of claim 4, wherein said average magnitude surface gradient is computed along contours specified by a range of threshold values for a set of computed tomography images.

7. The method of claim 6, wherein said range of threshold values is restricted to a specific range for high intensity nodules.

8. The method of claim 7, wherein upper and lower limits of said range of threshold values are empirically-based tuning-parameters.

9. The method of claim 8, wherein said range of threshold values is between about −900 Hounsfield units and about −650 Hounsfield units.

10. The method of claim 1, wherein computing further comprises computing a centroid of the grown region.

11. The method of claim 10, wherein said initial cue point is used as said refined cue point if said centroid is not contained within said core estimation.

12. The method of claim 1, further comprising:
using said refined cue point in a subsequent segmentation step.

13. The method of claim 12, wherein said subsequent segmentation step further comprising:
growing a region about said refined cue point; and
computing a new cue point using said grown region.

14. The method of claim 1, wherein said initial cue point is provided by a computer-aided detection system.

15. The method of claim 1, further comprising:
providing interactively said initial cue point by user input.

16. The method of claim 15, wherein said user input comprises one of a mouse, a touch screen device, a keyboard, and combinations thereof.

17. The method of claim 1, wherein said lesion is detected during a computed tomography examination.

18. A method of providing a refined cue point for a lesion segmentation, the method comprising:
providing an initial cue point for said lesion;
growing a region about said initial cue point;
computing a new cue point of the grown region;
utilizing said computed new cue point as said refined cue point; and
using said refined cue point in a subsequent segmentation step.

19. The method of claim 18, wherein said subsequent segmentation step comprises the steps of:
estimating a spherical metric about said refined cue point;
fitting an ellipsoid to said grown region to define a pruning boundary; and
pruning to remove any external anatomical structures outside said pruning boundary.

20. The method of claim 19, wherein estimating said spherical metric further comprises using the smallest structuring element yielding an object with a sphericity greater than or equal to a predetermined threshold.

21. The method of claim 20, wherein said sphericity is a ratio of volume of said lesion to said volume of a sphere with a radius that is the length from said refined cue point to the point farthest from said refined cue point that is contained within said lesion.

22. The method of claim 20, wherein said predetermined threshold is about 0.15.

23. The method of claim 19, wherein fitting further comprises using said refined cue point as the center of said ellipsoid and the covariance of the said refined cue point voxel defines the shape of said ellipsoid.

24. The method of claim 19, wherein fitting further comprises forming ellipsoids of different sizes and comparing said ellipsoids to said grown region.

25. The method of claim 19, wherein fitting further comprises selecting said ellipsoid with the minimum Hamming distance to said grown region.

26. The method of claim 25, wherein Hamming distance is the sum of differing voxels for two binary masks.

27. The method of claim 19, wherein an semi-ellipsoidal model is used for fitting when said lesion is juxtapleural.

28. The method of claim 27, wherein said refined cue point is the contact surface between said lesion and an organ wall and is used as the center of said ellipsoid and said voxel containing said refined cue point is mirrored about said refined cue point to create an artificial symmetric core.

29. The method of claim 28, wherein voxels of said artificial symmetric core are estimated and used for ellipsoid fit.

30. The method of claim 29, wherein the Hamming distance for said juxtapleural lesion is between said estimated ellipsoid fit and said grown region within the area of said lesion in the organ.

31. The method of claim 19, wherein pruning further comprises logically ANDing said ellipsoid with said grown region to create said pruning boundary.

32. The method of claim 19, wherein pruning further comprises removing all structures that do not have characteristics of a lesion surface.

33. The method of claim 32, wherein removing involves removing all objects that penetrate an outer ellipsoid that is larger and of the same shape as said ellipsoid.

34. The method of claim 33, wherein any voxel outside of said outer ellipsoid is removed.

35. The method of claim 33, wherein the size of said outer ellipsoid is a tuning parameter that controls the acceptable level of departure from said ellipse.

36. A method for refining a lesion segmentation, the method comprising:
computing an initial lesion segmentation;
computing the angle of surface gradient at a voxel on the surface of the lesion;
computing the difference angle between the angle of the surface gradient and the angle of radial vector at the voxel; and
removing the voxel from the initial lesion segmentation if the absolute value of the difference angle exceeds a predetermined threshold.

37. The method of claim 36, wherein said predetermined threshold is in the interval between about 75 degrees to about 85 degrees.

38. The method of claim 36, wherein said predetermined threshold is about 80 degrees.

39. A method for registering imagery from two sets of volumetric image data, the method comprising:
forming a first maximum intensity projection image from a first volumetric image set;
forming a second maximum intensity projection image from a second volumetric image set;
correlating said first maximum intensity projection image within said second maximum intensity projection image;
finding the location of maximum correlation value; and
using said location of said maximum correlation value to register said two volumetric image sets.

40. The method of claim 39, further comprising:
identifying body regions by preprocessing; and
computing said first maximum intensity projection image and said second maximum intensity projection image using voxels only within said body regions.

41. The method of claim 39, further comprising:
computing a coronal maximum intensity projection image to emphasis structures with high intensities in both said first volumetric image set and said second volumetric image set.

42. The method of claim 39, wherein finding further comprises determining horizontal and vertical offsets by locating the x, y coordinates of a maximum value of the two-dimensional correlation of said first maximum intensity projection image and said second maximum intensity projection image.

43. The method of claim 42, wherein said horizontal and vertical offsets correspond to axial and coronal displacements in said first and said second volumetric image sets since said first maximum intensity projection image and said second maximum intensity projection image are formed in the coronal direction.

44. The method of claim 39, further comprising:
cross-correlating said first maximum intensity projection image and said second maximum intensity projection image to produce a correlation surface.

45. The method of claim 44, wherein a peak in said correlation surface provides horizontal and vertical offsets of said maximum correlation value for registration.

46. The method of claim 39, further comprising:
interpolating when the interpixel spacings of said first maximum intensity projection image and said second maximum intensity projection image are unequal.

47. The method of claim 39, wherein said first volumetric image set and said second volumetric image set are obtained from different computed tomography examinations.

* * * * *